US010664755B2

(12) United States Patent
Lu et al.

(10) Patent No.: US 10,664,755 B2
(45) Date of Patent: May 26, 2020

(54) SEARCHING METHOD AND SYSTEM BASED ON MULTI-ROUND INPUTS, AND TERMINAL

(71) Applicant: Baidu Online Network Technology (Beijing) Co., Ltd, Beijing (CN)

(72) Inventors: Guang Lu, Beijing (CN); Qiang Ju, Beijing (CN); Xiajun Luo, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 234 days.

(21) Appl. No.: 15/854,481

(22) Filed: Dec. 26, 2017

(65) Prior Publication Data
US 2019/0147345 A1 May 16, 2019

(30) Foreign Application Priority Data
Nov. 16, 2017 (CN) .......................... 2017 1 1139798

(51) Int. Cl.
*G06F 17/00* (2019.01)
*G06N 5/00* (2006.01)
(Continued)

(52) U.S. Cl.
CPC ......... *G06N 5/003* (2013.01); *G06F 16/3344* (2019.01); *G06F 16/3346* (2019.01);
(Continued)

(58) Field of Classification Search
CPC ............. G06F 16/3344; G06F 16/3346; G06F 17/30684; G06F 17/30687
See application file for complete search history.

(56) References Cited

U.S. PATENT DOCUMENTS 7,330,826 B1 * 2/2008 Porat .................. G06Q 30/0601
  705/26.3
9,760,806 B1 * 9/2017 Ning .................. G06K 9/00791
(Continued)

FOREIGN PATENT DOCUMENTS

CN 103229120 A 7/2013
CN 104679472 A 6/2015
(Continued)

OTHER PUBLICATIONS

China Notification on Grant of the Patent Right for Invention corresponding to Chinese Application No. 201711139798.8, dated Jan. 28, 2019.
(Continued)

*Primary Examiner* — Hasanul Mobin
(74) *Attorney, Agent, or Firm* — Arent Fox, LLP (57) ABSTRACT

A searching method and system based on multi-round inputs and a terminal are provided. The method comprises: acquiring search conditions input by a user in multiple searches; determining a multi-round property between at least two searches of the multiple searches; determining a search purpose of one of the search conditions, and determining that the search purpose of the one of the search conditions is a multi-round search purpose; generating search results based on the multi-round search purpose and search conditions input by the user; and ranking the generated search results, and determining and outputting an optimal search result. According to the searching method provided by the present application, a machine can understand a user's purpose under a continuous multi-round interactions by understanding the context, so that the use initiative of the user is improved.

17 Claims, 4 Drawing Sheets

(51) Int. Cl.
*G06K 9/62* (2006.01)
*G06F 16/951* (2019.01)
*G06F 16/33* (2019.01)
*G06N 7/00* (2006.01)
*G06N 20/20* (2019.01)

(52) U.S. Cl.
CPC .......... *G06F 16/951* (2019.01); *G06K 9/627* (2013.01); *G06K 9/6267* (2013.01); *G06K 9/6282* (2013.01); *G06N 7/005* (2013.01); *G06N 20/20* (2019.01)

(56) References Cited

U.S. PATENT DOCUMENTS

| | | | | |
|---|---|---|---|---|
| 10,268,679 | B2* | 4/2019 | Li | G06F 17/279 |
| 10,395,276 | B1* | 8/2019 | Fulghum | G06Q 30/0257 |
| 2002/0019737 | A1* | 2/2002 | Stuart | G10L 15/26 |
| | | | | 704/275 |
| 2009/0240493 | A1* | 9/2009 | Zhang | G10L 19/10 |
| | | | | 704/219 |
| 2012/0291022 | A1* | 11/2012 | Mehta | G06F 8/60 |
| | | | | 717/176 |
| 2013/0259379 | A1* | 10/2013 | Slaney | G06K 9/6263 |
| | | | | 382/190 |
| 2013/0332729 | A1* | 12/2013 | Ito | H04L 9/002 |
| | | | | 713/165 |
| 2014/0289066 | A1* | 9/2014 | Shah | G06Q 30/08 |
| | | | | 705/26.3 |
| 2016/0026696 | A1 | 1/2016 | Madhavan et al. | |
| 2017/0357720 | A1* | 12/2017 | Torabi | G06K 9/00718 |
| 2017/0372200 | A1* | 12/2017 | Chen | G06N 3/08 |
| 2018/0081949 | A1* | 3/2018 | DiTomaso | G06N 7/005 |
| 2018/0098330 | A1* | 4/2018 | Nguyen | H04W 72/082 |
| 2018/0121792 | A1* | 5/2018 | Tristan | G06N 3/0445 |
| 2018/0196599 | A1* | 7/2018 | Kim | G06F 3/061 |
| 2018/0196881 | A1* | 7/2018 | Lundin | G06N 3/0445 |
| 2018/0234348 | A1* | 8/2018 | Goloubew | H04L 41/142 |
| 2018/0253839 | A1* | 9/2018 | Zur | A61B 1/00009 |
| 2019/0005090 | A1* | 1/2019 | Zhang | G06F 17/2785 |
| 2019/0005192 | A1* | 1/2019 | Kermani | C12Q 1/6869 |
| 2019/0087728 | A1* | 3/2019 | Agarwal | G06F 16/2455 |
| 2019/0114509 | A1* | 4/2019 | Deng | G06N 5/003 |

FOREIGN PATENT DOCUMENTS

| | | | |
|---|---|---|---|
| CN | 105068661 A | * | 11/2015 |
| CN | 106294618 A | | 1/2017 |
| CN | 106663129 A | | 5/2017 |
| CN | 106708893 A | | 5/2017 |
| CN | 107093865 A | | 9/2017 |
| CN | 107193978 A | | 9/2017 |
| CN | 107239825 A | | 10/2017 |
| JP | 2014528134 A | | 10/2014 |
| JP | 2017228160 A | | 12/2017 |
| JP | 2018106702 A | | 7/2018 |

OTHER PUBLICATIONS

China Notification to Go Through Formalities for Registration corresponding to Chinese Application No. 201711139798.8, dated Jan. 28, 2019.
China Search Report corresponding to Chinese Application No. 201711139798.8, dated Jan. 22, 2019.
Chinese Office Action issued in Chinese Patent Application No. 201711139798.8 dated Jun. 26, 2018.
Search Report issued in Chinese Patent Application No. 201711139798.8 dated Jun. 19, 2018.
Japan Notice of Reasons for Refusal corresponding to Japanese Application No. 2018-142243, dated Jun. 12, 2019.
Japan Decision to Grant Patent corresponding to Japanese Application No. 2018-142243, dated Sep. 25, 2019.

* cited by examiner

SEARCHING METHOD AND SYSTEM BASED ON MULTI-ROUND INPUTS, AND TERMINAL

CROSS REFERENCE TO RELATED APPLICATION

The present application claims the benefit of priority to Chinese Patent Application No. 201711139798.8, filed before the State Intellectual Property Office on Nov. 16, 2017, and entitled "Searching Method and System Based on Multi-Round Inputs, and Terminal", which is incorporated in the present application by reference in its entirety.

TECHNICAL FIELD

The present application relates to the analysis of exchanged information during multi-round interactions of a human being with an artificial intelligence, and in particular, to a searching method and system based on multi-round inputs, and a terminal.

BACKGROUND

At present, artificial intelligence has been well known and applied. In human-computer dialogues, a robot are usually produced to have the abilities to follow instructions, answer questions and guide services, and can specifically meet requirements of professional occasions such as family care, children care, healthcare, education, government offices, banks, hotels, tourist spots.

Currently, most information acquisition ways in people's lives are based on social scenarios. However, a majority of graph recognition products only serve as a separate tool and cannot be associated with original demand scenarios of users.

In single-round human-computer interactions, that is, a user performing inputs in a single operation or there being no correlation between multiple inputs of a user, an artificial intelligence can respond to queries of the user more accurately with the best output. But, if there is a certain correlation between the multiple inputs of the user, a multi-round input will be generated, so it requires an artificial intelligence to understand the inputs according to the context of the inputs. However, in the existing methods, identifying a multi-round property and a multi-round case is achieved mainly by using simple literal and syntactic features, but the multi-round property and a multi-round case cannot be accurately determined.

In addition, in a low context that the user input is relatively unclear, it is unable to accurately determine whether the user intends to make a multi-round search in the existing methods. In the existing methods, there is no modeling of a language model of search conditions in multiple inputs, so that in the low context, correct determination of a multi-round search purpose cannot be achieved.

Therefore, by the existing artificial intelligence, it is unable to output the best result meeting or satisfying the user's actual demand in a human-computer interaction of a multi-round case, a low-context case, or a low-context case of a multi-round interaction, such that the use initiative of the users is affected.

SUMMARY

Embodiments of the present application provide a searching method and system based on multi-round inputs and a terminal, so as to at least solve or release one or more technical problems in the existing technology, and provide at least one beneficial option.

According to a first aspect, a searching method based on multi-round inputs is provided by the embodiments of the present application.

In the first aspect of the present application, a searching method based on multi-round inputs includes: acquiring search conditions input by a user in multiple searches, wherein the multiple searches comprise at least two searches; determining a multi-round property between at least two searches of the multiple searches; wherein the multi-round property represents a correlation of the search conditions of the at least two searches; determining a search purpose of one of the search conditions, and determining that the search purpose of the one of the search conditions is a multi-round search purpose, wherein the multi-round search purpose indicates that the one of the search conditions is associated with the other search conditions input by the user; generating search results based on the multi-round search purpose and search conditions input by the user, wherein the search results is generated by combining the search conditions; and ranking the generated search results, and determining and outputting an optimal search result.

With respect to the first aspect, the determining a multi-round property between at least two searches of the multiple searches comprises: smoothing the search conditions according to resources, requirements and a prior distribution; calculating a bi-gram-based language model for the search condition based on the smoothed search conditions; and determining the multi-round property between the at least two searches of the multiple searches according to the bi-gram-based language model.

With respect to the first aspect, the determining a search purpose of one of the search conditions and determining that the search purpose of the one of the search conditions is a multi-round search purpose comprises: calculating an probability that the one of the search condition is a combined search condition based on a structured analysis model or a deep learning model; and determining that the search purpose of the one of the search is the multi-round search purpose if the calculated probability is greater than a preset threshold.

Preferably, the deep learning model is an Long Short Term Memory (LSTM) model, and the probability that the one of the search conditions is the combined search condition is obtained by performing a classification training with the LSTM model; or the probability that the search condition of this search is a combined search condition is calculated in the structured analysis model by a formula:

$$p(x) = \frac{\sum_{i=1}^{n}(x_i w_i \lambda_i \mid \text{domain}, \phi)}{\sum_{i=1}^{n} x_i w_i},$$

wherein $\phi$ is a set of structured features, w is importance of a term in the one of the search condition, $\lambda$ is a weight of a positive or negative feature, domain is a search purpose of the last search, and x is a set of terms in the one of the search condition; wherein a term is a semantic unit.

With respect to the first aspect, ranking the generated search results, and determining and outputting an optimal search result comprises: pruning the generated search results; and ranking the search results retained after pruning, and determining and outputting the optimal search result.

Preferably, the pruning operation is performed based on the following conditions that: the one of the search conditions is only associated to a search condition of the last search; the generated search results comprises newly added semantic data in this search; and the generated search results comprises reference semantic expressions in this search and data corresponding to the reference semantic expressions.

With respect to the first aspect, the ranking the generated search results comprises: calculating occurrence probabilities of the respective generated search results based on a generative model or a discriminant model; and ranking the generated search results according to the calculated occurrence probabilities.

Preferably, the discriminative model is a Gradient Boosted Decision Tree (GBDT) model and the occurrence probability of a search result is calculated by performing a discriminative training with the GBDT model; or the occurrence probabilities of the respective generated search results are calculated with the generative model according to a probability calculation formula as follows:

$$P(\text{candidate}_n) = \eta \cdot P(\text{slots}_n | o_{t+1}, h_{t+1}, a_t).$$

in a case that the search conditions are independent of each other, a following calculation formula is obtained:

$$P(candidate_n) = \eta \cdot \prod\nolimits_{i=0} P(slot_i | o_{t+1}, h_{t+1}, a_t)$$
$$= \theta \cdot \prod\nolimits_{i=0} P(slot_i | o_{t+1}) \cdot P(slot_i | h_{t+1}) \cdot P(slot_i | a_t),$$

wherein $\eta$ and $\theta$ are normalized constants, slot is a key search fragment of the search condition, a is an operation executed, h is a history state record, and o is an detected value for a user input; and, $$P(\text{slot}_i | o_{t+1}) = P(\text{slot}_i | \text{slots}_{t+1}) \cdot P(\text{slot}_i | \text{terms}_{t+1}) \cdot \text{rule}$$
(syntactical feature)

$$P(\text{slot}_i | h_{t+1}) = \text{function}(\text{session num}, \text{session time})$$

$$P(\text{slot}_i | a_t) = \text{rule}(\text{bot state})$$

wherein $P(\text{slot}_i | \text{slots}_{t+1})$ represents an occurrence probability of a combination of a slot in the search conditions of the last search and a slot in the one of the search conditions, $P(\text{slot}_i | \text{terms}_{t+1})$ represents an occurrence probability of a combination of a slot in the search conditions of the last search and a term that are not comprised in the slot of the one of the search conditions, the rule(syntactical feature) represents a rule of syntactical features, the function (session num, session time) represents an attenuation function of the probability of a slot over time and input times, and the rule(bot state) represents a rule-based calculation function in combination of an action state of a system.

With respect to the first aspect, after acquiring search conditions input by a user in multiple searches, the searching method further comprises: determining the search condition input by the user is incomprehensible if more than one result is obtained by searching according to the literal meaning of the search condition; and querying the user for a comprehensible search condition.

Preferably, the querying is performed in at least one of the following forms: questioning, requesting for selecting and requesting for confirming.

According to a second aspect, a searching system based on multi-round inputs is provided by the embodiments of the present application.

In the second aspect of the present application, the multi-round state tracking system includes: an acquiring and determining unit configured to acquire search conditions input by a user in multiple searches and determine a multi-round property between at least two searches of the multiple searches; wherein the multiple searches comprise at least two searches and the multi-round property represents a correlation of the search conditions of the at least two searches; a multi-round search purpose determining unit configured to determine a search purpose of one of the search conditions, and determine that the search purpose of the one of the search conditions is a multi-round search purpose, wherein the multi-round search purpose indicates that the one of the search conditions is associated with the other search conditions input by the user; a search result generating unit configured to generate search results based on the multi-round search purpose and search conditions input by the user, wherein the search results is generated by combining the search conditions; and a ranking unit configured to rank the generated search results, and determine and outputting an optimal search result.

With respect to the second aspect, the acquiring and determining unit is further configured to: smooth the search conditions according to resources, requirements and a prior distribution; calculate a bi-gram-based language model for the search condition based on the smoothed search conditions; and determine the multi-round property between the at least two searches of the multiple searches according to the bi-gram-based language model.

With respect to the second aspect, the multi-round search purpose determining unit is further configured to: calculate an probability that the one of the search condition is a combined search condition based on a structured analysis model or a deep learning model; and determine that the search purpose of the one of the search is the multi-round search purpose if the calculated probability is greater than a preset threshold; wherein the deep learning model is an Long Short Term Memory (LSTM) model, and the probability that the one of the search conditions is the combined search condition is obtained by performing a classification training with the LSTM model; or the probability that the search condition of this search is a combined search condition is calculated in the structured analysis model by a formula:

$$p(x) = \frac{\sum_{i=1}^{n} (x_i w_i \lambda_i | \text{domain}, \phi)}{\sum_{i=1}^{n} x_i w_i},$$

wherein $\phi$ is a set of structured features, w is importance of a term in the one of the search conditions, $\lambda$ is a weight of a positive or negative feature, domain is a search purpose of the last search, and x is a set of terms in the one of the search condition; wherein a term is a semantic unit.

With respect to the second aspect, the search result generating is further configured to prune the generated search results; and the ranking unit is further configured to rank the search results retained after pruning, and determine and outputting the optimal search result.

Preferably, the pruning is performed based on the following conditions that: the one of the search conditions is only associated to a search condition of the last search; the generated search results comprises newly added semantic data in this search; and the generated search results comprises reference semantic expressions in this search and data corresponding to the reference semantic expressions.

With respect to the second aspect, the ranking unit is further configured to: calculate occurrence probabilities of the respective generated search results based on a generative model or a discriminant model; and rank the generated search results according to the calculated occurrence probabilities; wherein the discriminative model is a Gradient Boosted Decision Tree (GBDT) model and the occurrence probability of a search result is calculated by performing a discriminative training with the GBDT model; or the occurrence probabilities of the respective generated search results are calculated with the generative model according to a probability calculation formula as follows:

$$P(candidate_n) = \eta \cdot P(slots_n | o_{t+1}, h_{t+1}, a_t).$$

in a case that the search conditions are independent of each other, a following calculation formula is obtained:

$$P(candidate_n) = \eta \cdot \prod_{i=0} P(slot_i | o_{t+1}, h_{t+1}, a_t)$$
$$= \theta \cdot \prod_{i=0} P(slot_i | o_{t+1}) \cdot P(slot_i | h_{t+1}) \cdot P(slot_i | a_t),$$

wherein η and 0 are normalized constants, slot is a key search fragment of the search condition, a is an operation executed, h is a history state record, and o is an detected value for a user input; and, $P(slot_i|o_{t+1})=P(slot_i|slots_{t+1}) \cdot P(slot_i|terms_{t+1}) \cdot$rule (syntactical feature)

$P(slot_i|h_{t+1})$=function(session num,session time)

$P(slot_i|a_t)$=rule(bot state)

wherein $P(slot_i|slots_{t+1})$ represents an occurrence probability of a combination of a slot in the search conditions of the last search and a slot in the one of the search conditions, $P(slot_i|terms_{t+1})$ represents an occurrence probability of a combination of a slot in the search conditions of the last search and a term that are not comprised in the slot of the one of the search conditions, the rule(syntactical feature) represents a rule of syntactical features, the function (session num, session time) represents an attenuation function of the probability of a slot over time and input times, and the rule(bot state) represents a rule-based calculation function in combination of an action state of a system.

With respect to the second aspect, the acquiring and determining unit is further configured to, after acquiring search conditions input by a user in multiple searches, determine the search condition input by the user is incomprehensible if more than one result is obtained by searching according to the literal meaning of the search condition; and query the user for a comprehensible search condition.

According to a third aspect, a terminal is provided by the embodiments of the present application. The terminal includes one or more processors, a memory configured to store one or more programs, and a communication interface configured to communicate between the memory and the one or more processors, wherein the one or more processors implement the method described in any of the implementations in the above first aspect when executing the one or more programs.

Any of the above technical solutions has the following advantages or beneficial effects: a machine can know the search purpose of the user in continuous multiple searches, and can understand the search purpose of the user under a continuous multi-search case and provide the best feedback to the user; and moreover, the user may continuously modify or improve his/her requirements in the interactions. In addition, the technical effect of helping the user to find a satisfactory result by questioning, a request for selecting or a request for confirming in case that the input from the user is incomprehensible can be achieved. In an interaction, the user's purpose can be accurately understood and satisfied, so that the user can obtain required information efficiently.

The above description is merely for illustrating the purpose of the present application, and is not intended to limit the present application in any way. In addition to the aspects, implementations and features described above, further aspects, implementations and features of the present application will be understood easily with reference to the drawings and the following detailed description.

BRIEF DESCRIPTION OF THE DRAWINGS

In the drawings, unless otherwise specified, the same reference numerals refer to the same or similar parts or elements. The drawings are not necessarily drawn to scale. It should be understood that these drawings only describe some implementations disclosed in the present application and shall not be considered as restrictions of the scope of the present application.

DETAILED DESCRIPTION OF THE EMBODIMENTS

In the following, only some exemplary embodiments are briefly described. As can be appreciated by those skilled in the art, the described embodiments may be modified in various ways without departing from the spirit or scope of the present application. Thus, the drawings and the description are considered exemplary rather than limiting in nature.

Figure 1:
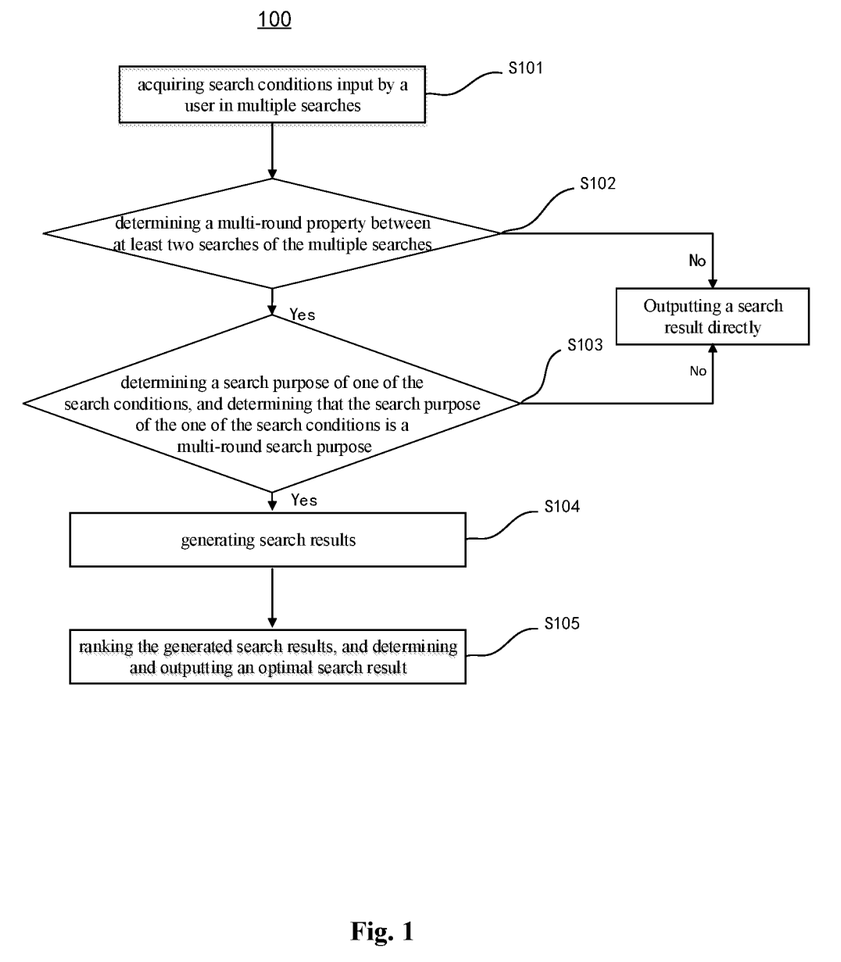
FIG. 1 shows a flow chart of a searching method 100 based on multi-round inputs according to an embodiment of the present application.

Referring to FIG. 1, according to a first aspect of the present application, a searching method 100 based on multi-round inputs is provided by the embodiments of the present application.

The searching method 100 based on multi-round inputs includes the steps S101-S105.

S101, acquiring search conditions input by a user in multiple searches, wherein the multiple searches comprise at least two searches.

S102, determining a multi-round property between at least two searches of the multiple searches; wherein the multi-round property represents a correlation of the search conditions of the at least two searches. If the multi-round property between at least two searches of the multiple searches is determined, the following steps S103-S105 are proceeded; otherwise, a search result will be output based on the search condition of the last search.

In an embodiment, the determining a multi-round property between at least two searches of the multiple searches comprises: smoothing the search conditions according to resources, requirements and a prior distribution; calculating a bi-gram-based language model for the search condition based on the smoothed search conditions; and determining the multi-round property between the at least two searches of the multiple searches according to the bi-gram-based language model.

For example, in a human-computer interaction, if the user inputs the search condition "hip-hop song" after inputting the search condition "Jay Chou", and it is obtained that Jay Chou has performed or released a hip-hop song by smoothing the above two search conditions with resources, requirements and prior distribution, then a certain language model can be formed between "Jay Chou" and "hip-hop song" and the two search conditions are associated with each other. Therefore, it is considered or determined that "Jay Chou" and "hip-hop song" have a multi-round property therebetween. However, if the user inputs the search condition "rock song" after inputting the search condition "Jay Chou", it is determined that "Jay Chou" is not associated with "rock song" since Jay Chou never performs or releases a rock song according to a resource database, so that it is considered or determined that "Jay Chou" and "rock song" do not have a multi-round property therebetween.

S103, determining a search purpose of one of the search conditions, and determining that the search purpose of the one of the search conditions is a multi-round search purpose, wherein the multi-round search purpose indicates that the one of the search conditions is associated with the other search conditions input by the user. If the search purpose of this search is a multi-round search purpose, the following steps S104-S105 are proceeded; otherwise, a search result will be output based on the last search condition of the multiple searches.

In an embodiment, particularly, even if the search conditions input by the user have a multi-round property, the search purpose for each search of the user needs to be determined. For example, although the search condition "Jay Chou" and "hip-hop song" input by the user in two searches have a multi-round property, the search purpose of the user by inputting the search condition "hip-hop song" needs to be determined. The search purpose of the user needs to be determined whether to be "playing a hip-hop song performed or released by Jay Chou" or "only playing a hip-hop song". If it is determined that the search purpose of the user is determined to be "playing a hip-hop song performed or released by Jay Chou", the search purpose of the user at this time is a multi-round search purpose, and step S104 is proceeded. If it is determined that the search purpose of the user is determined to be, for example, "only listening to a hip-hop song", rather than "listening to a Jay Chou's hip-hop song", the search condition of the user in this search is determined to be a non-multi-round search purpose, and a search result based on the search condition is output directly.

Meanwhile, through analysis and calculation, it is also possible to determine whether the search purpose of the user in the current search is a multi-round search purpose or not in a case where the search condition input by a user is not clear or specific. For example, the case is: the search purpose of the user for the first time is "playing Wanting Qu's"; and the other search purpose of the user for the second time is "playing an English song of Wanting Qu", however, since the search condition input by the user is unclear in meaning, for example, for the first time, it is "I want to listen to a song of Wanting Qu", and for the second time, it is "listening to an English song". Here, "listening to an English song" has an uncertain meaning, so that a low context is formed. At this time, if the search purpose of the user is determined as "I want to listen to an English song of Wanting Qu" through analysis and calculation with the above steps S101-S103, then it is determined that the search purpose of this search of the user is a multi-round search purpose and steps S104-S105 are proceeded.

More particularly, the determining a search purpose of one of the search conditions and determining that the search purpose of the one of the search conditions is a multi-round search purpose comprises: calculating an probability that the one of the search condition is a combined search condition based on a structured analysis model or a deep learning model; and determining that the search purpose of the one of the search is the multi-round search purpose if the calculated probability is greater than a preset threshold.

Preferably, the deep learning model is an Long Short Term Memory (LSTM) model, and the probability that the one of the search conditions is the combined search condition is obtained by performing a classification training with the LSTM model; or the probability that the search condition of this search is a combined search condition is calculated in the structured analysis model by a formula:

$$p(x) = \frac{\sum_{i=1}^{n}(x_i w_i \lambda_i \mid \text{domain}, \phi)}{\sum_{i=1}^{n} x_i w_i},$$

wherein $\phi$ is a set of structured features, w is importance of a term in the one of the search condition, $\lambda$ is a weight of a positive or negative feature, domain is a search purpose of the last search, and x is a set of terms in the one of the search condition; wherein a term is a semantic unit.

S104, generating search results based on the multi-round search purpose and search conditions input by the user, wherein the search results is generated by combining the search conditions.

In an embodiment, particularly, as the number of human-computer interactions increases, a plurality of multi-round search purposes will be formed through the execution of steps S101-S103, and a plurality of search results may be obtained depending on the plurality of multi-round search purposes.

S105, ranking the generated search results, and determining and outputting an optimal search result.

In an embodiment, particularly, an occurrence probabilities of the respective generated search results is calculated based on a generative model or a discriminant model.

Preferably, the discriminative model is a Gradient Boosted Decision Tree (GBDT) model and the occurrence probability of a search result is calculated by performing a discriminative training with the GBDT model; or the occurrence probabilities of the respective generated search results are calculated with the generative model according to a probability calculation formula as follows:

$$P(\text{candidate}_n) = \eta \cdot P(\text{slots}_n \mid o_{t+1}, h_{t+1}, a_t);$$

in a case that the search conditions are independent of each other, a following calculation formula is obtained:

$$P(candidate_n) = \eta \cdot \prod_{i=0} P(slot_i \mid o_{t+1}, h_{t+1}, a_t)$$

$$= \theta \cdot \prod_{i=0} P(slot_i \mid o_{t+1}) \cdot P(slot_i \mid h_{t+1}) \cdot P(slot_i \mid a_t).$$

Here, η and θ are normalized constants, slot is a key search fragment of the search condition, for example, "song" only referring to a Jay Chou's song; a is an operation executed, h is a history state record, and o is an detected value for a user input, for example, a search condition input by a user and detected by a system being "playing a Jay Chou's song". In addition, $P(slot_i|o_{t+1})=P(slot_i|slots_{t+1}) \cdot P(slot_i|terms_{t+1}) \cdot \text{rule}$
(syntactical feature)

$P(slot_i|h_{t+1})=\text{function(session num, session time)}$ $P(slot_i|a_t)=\text{rule(bot state)}$ wherein $P(slot_i|o_{t+1})$ represents an occurrence probability of a combination of a slot in the search conditions of the last search and a slot in the one of the search conditions, $P(slot_i|terms_{t+1})$ represents an occurrence probability of a combination of a slot in the search conditions of the last search and a term that are not comprised in the slot of the one of the search conditions, the rule(syntactical feature) represents a rule of syntactical features; $P(slot_i|h_{t+1})$ represents a probability of a combination of a slot in the search conditions of the last search under the current system history record; the function (session num, session time) represents an attenuation function of the probability of a slot over time and input times, and the rule(bot state) represents a rule-based calculation function in combination of an action state of a system.

In the method 100, after acquiring the search conditions input by the user, a multi-round property between at least two searches of the multiple searches is determined; a search purpose of the one of the search conditions is a multi-round search purpose is determined; search results are generated based on the multi-round search purpose and search conditions input by the user and the generated search results are ranked to obtain the best search result. In this way, a machine can know the search purpose of the user in continuous multiple searches, and can understand the search purpose of the user under a continuous multi-search case and provide the best feedback to the user; and moreover, the user may continuously modify or improve his/her requirements in the interactions.

Figure 2:
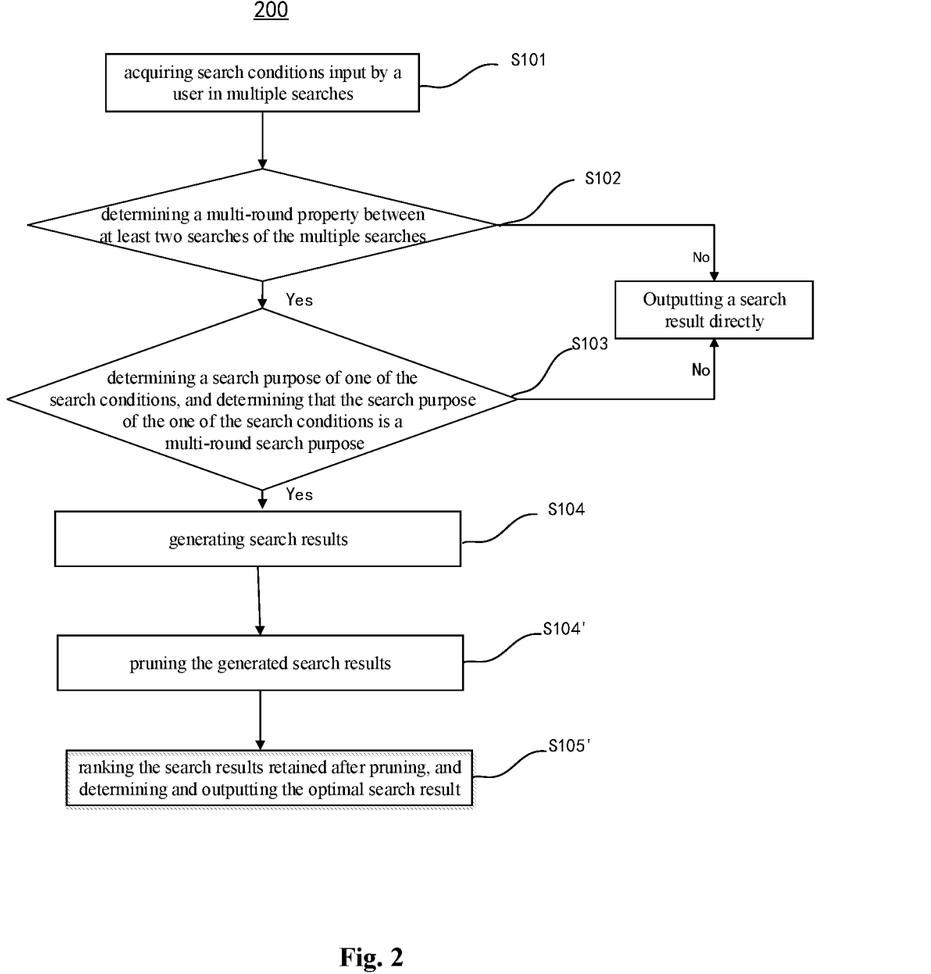
FIG. 2 shows a flow chart of a searching method 200 based on multi-round inputs according to another embodiment of the present application.

Referring to FIG. 2, according to the first aspect, a searching method 200 based on multiple inputs is provided by an embodiment of the present application. The method 200 includes: acquiring search conditions input by a user in multiple searches, wherein the multiple searches comprise at least two searches; determining a multi-round property between at least two searches of the multiple searches; wherein the multi-round property represents a correlation of the search conditions of the at least two searches; determining a search purpose of one of the search conditions, and determining that the search purpose of the one of the search conditions is a multi-round search purpose, wherein the multi-round search purpose indicates that the one of the search conditions is associated with the other search conditions input by the user; generating search results based on the multi-round search purpose and search conditions input by the user, wherein the search results is generated by combining the search conditions; pruning the generated search results; and ranking the search results retained after pruning, and determining and outputting the optimal search result.

The searching method 200 based on multiple inputs includes the following steps S101-S104, S104' and S105'.

S101, acquiring search conditions input by a user in multiple searches, wherein the multiple searches comprise at least two searches.

S102, determining a multi-round property between at least two searches of the multiple searches; wherein the multi-round property represents a correlation of the search conditions of the at least two searches.

S103, determining a search purpose of one of the search conditions, and determining that the search purpose of the one of the search conditions is a multi-round search purpose, wherein the multi-round search purpose indicates that the one of the search conditions is associated with the other search conditions input by the user.

S104, generating search results based on the multi-round search purpose and search conditions input by the user, wherein the search results is generated by combining the search conditions.

S104', pruning the generated search results.

S105', ranking the search results retained after pruning, and determining and outputting the optimal search result.

S101-S104 in the method 200 are identical with S101-S104 in the method 100 which are described above, and thus will not be repeated herein.

With the increase of the number of human-computer interactions, the number of the generated search results increases, and the size of a space thus formed can be described by the following formula:

$$\text{space(candidate)}=\Pi_{t=0}^{count(slot)} 2^{count(value_{i,t}+value_{i,t-1}+value_{i,t-2}+\cdots)}-1.$$

As can be seen from the above formula, the search result space is expanded exponentially, and this rapid increase will seriously affect the calculation efficiency. Therefore, step S104' of pruning the generated search results is required.

The pruning operation is performed based on the following conditions.

First condition, the current search is only related to the search closest to it in time Particularly, as the number of human-computer interactions increases, the user has sequentially input a plurality of search conditions. In the first condition, a rule that the search results obtained in the current search are only related to those obtained in the last search is established. For example, if the user inputs the search condition "Jay Chou" in the first search, inputs the search condition "Chinese style music" in the n-th search, and inputs the search condition "green flower porcelain" in the (n+1)-th search, then, according to the first condition, the search results obtained by inputting "green flower porcelain" are only related to those obtained by inputting "Chinese style music" in the search results obtained by the search condition input by the user in the multiple searches.

In a second condition, the generated search results include newly added semantic data in the current search.

In an embodiment, particularly, as the number of human-computer interactions increases, multiple search results will be obtained through the above steps, and include different search conditions input by the user. In the second condition, a rule that the generated search results include data indicating newly added semantics in the current search is made. For example, if the user inputs the search condition "Jay Chou" in the first search, inputs search condition "Jay Chou's Chinese style music" in the n-th search, and inputs the search condition "Jay Chou's green flower porcelain" in the (n+1)-th search, then, according to the second condition, the search results obtained by the search conditions input by the user in the multiple searches must include the newly added semantic data "green flower porcelain".

In a third condition, the generated search results include reference semantics appeared in the current search and data corresponding to the reference semantics.

In an embodiment, particularly, when the user inputs a search condition, incomplete expressions in semantics may appear in the current search, such that a low context is formed. These incomplete expressions in semantics will include respective reference semantic expressions and corresponding data is provided for the same. In the third condition, a rule that in the generated search results, reference semantic in the current search and the data corresponding to the reference semantic expressions must be included is made. For example, if the user inputs the search condition "Jay Chou" in the first search, inputs search condition "His Chinese style music" in the n-th search, and inputs "his green flower porcelain" in the (n+1)-th search; wherein the corresponding data of "his", as a reference semantic expression, is "Jay Chou", corresponding data of "Jay Chou's green flower porcelain" must be included in the generated search results according to the third condition.

Based on the method 100, the method 200 can not only realize the technical effects of the method 100, but also realize the technical effect of reducing the number of the generated search results by pruning the generated search results. In this way, a machine can respond and output more fastly, thus optimizing the user experience.

Figure 3:
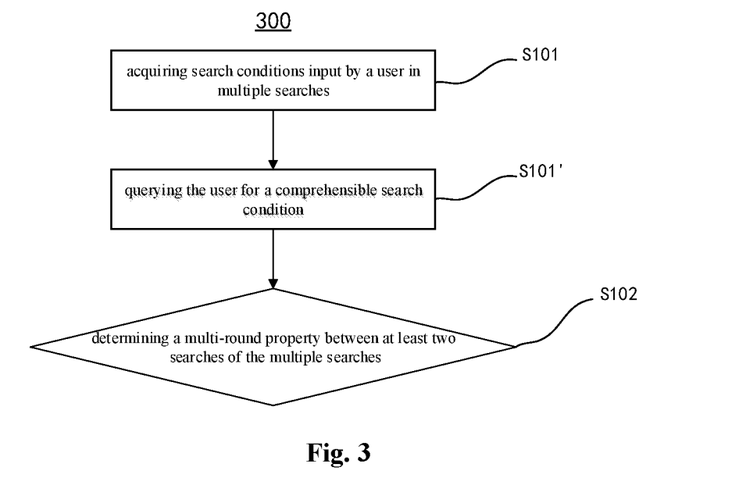
FIG. 3 shows a flow chart of a searching method 300 based on multi-round inputs 300 according to yet another embodiment of the present application.

Referring to FIG. 3, according to the first aspect, a searching method 300 based on multiple inputs is provided by an embodiment of the present application.

Based on the methods 100 and 200, the searching method 300 based on multiple inputs further includes step S101' performed between step S101 and step S102.

S101', determining the search condition input by the user is incomprehensible if more than one result is obtained by searching according to the literal meaning of the search condition; and querying the user for a comprehensible search condition; wherein the querying is performed in at least one of the following forms: questioning, requesting for selecting and requesting for confirming In an embodiment, particularly, for example, if the search condition input by the user is "Jay Chou's latest album," and Jay Chou has released two albums A and B at the same time lately, the current search condition input by the user will be determined being incomprehensible. At this time, the querying will be performed firstly. A dialog box will pop up to question the user, such as "album A?", a formalized semantic expression; or if the answer returned from the user is NO, another question, such as "album B?" will be shown to the user for answering.

Based on the methods 100 and 200, the method 300 can not only realize the technical effects of the methods 100 and 200, but also realize the technical effect of helping the user to find a satisfactory result by questioning, a request for selecting or a request for confirming in case that the input from the user is incomprehensible.

Figure 4:
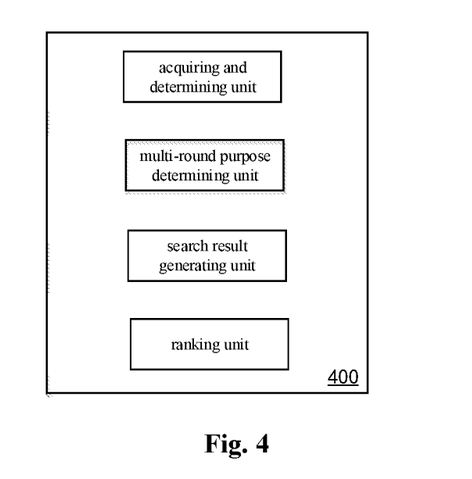
FIG. 4 shows a schematically structural view of a searching system 400 based on multi-round inputs 400 according to an embodiment of the present application.

Referring to FIG. 4, according to an embodiment of the second aspect of the present application, a searching system 400 based on multi-round inputs corresponding to the method described in FIGS. 1, 2 and 3 is provided. The system 400 includes an acquiring and determining unit, a multi-round purpose determining unit, a search result generating unit and a ranking unit.

The acquiring and determining unit is configured to acquire search conditions input by a user in multiple searches and determine a multi-round property between at least two searches of the multiple searches; wherein the multiple searches comprise at least two searches and the multi-round property represents a correlation of the search conditions of the at least two searches.

In an embodiment, particularly, the acquiring and determining unit is further configured to: smooth the search conditions according to resources, requirements and a prior distribution; calculate a bi-gram-based language model for the search condition based on the smoothed search conditions; and determine the multi-round property between the at least two searches of the multiple searches according to the bi-gram-based language model.

The multi-round purpose determining unit is configured to determine a search purpose of one of the search conditions, and determine that the search purpose of the one of the search conditions is a multi-round search purpose, wherein the multi-round search purpose indicates that the one of the search conditions is associated with the other search conditions input by the user.

In an embodiment, particularly, the multi-round search purpose determining unit is further configured to: calculate an probability that the one of the search condition is a combined search condition based on a structured analysis model or a deep learning model; and determine that the search purpose of the one of the search is the multi-round search purpose if the calculated probability is greater than a preset threshold;

wherein the deep learning model is an Long Short Term Memory (LSTM) model, and the probability that the one of the search conditions is the combined search condition is obtained by performing a classification training with the LSTM model; or the probability that the search condition of this search is a combined search condition is calculated in the structured analysis model by a formula:

$$p(x) = \frac{\sum_{i=1}^{n} (x_i w_i \lambda_i \mid \text{domain}, \phi)}{\sum_{i=1}^{n} x_i w_i},$$

wherein $\phi$ is a set of structured features, w is importance of a term in the one of the search conditions, $\lambda$ is a weight of a positive or negative feature, domain is a search purpose of the last search, and x is a set of terms in the one of the search condition; wherein a term is a semantic unit.

The search result generating unit configured to generate search results based on the multi-round search purpose and search conditions input by the user, wherein the search results is generated by combining the search conditions.

Further, the search result generating is further configured to prune the generated search results.

In an embodiment, particularly, the pruning is performed based on the following conditions that: the one of the search conditions is only associated to a search condition of the last search; the generated search results comprises newly added semantic data in this search; and the generated search results comprises reference semantic expressions in this search and data corresponding to the reference semantic expressions. The specific content of the above conditions is described in the above method 200, and thus is not repeated herein.

The ranking unit configured to rank the generated search results, and determine and outputting an optimal search result. When the search result generating unit is further configured to prune the generated search results, the ranking unit is further configured to rank the search results retained after pruning, and determine and outputting the optimal search result.

In an embodiment, particularly, the ranking unit is further configured to: calculate occurrence probabilities of the respective generated search results based on a generative model or a discriminant model; and rank the generated search results according to the calculated occurrence probabilities;

wherein the discriminative model is a Gradient Boosted Decision Tree (GBDT) model and the occurrence probability of a search result is calculated by performing a discriminative training with the GBDT model; or the occurrence probabilities of the respective generated search results are calculated with the generative model according to a probability calculation formula as follows:

$$P(candidate_n) = \eta \cdot P(slots_n | o_{t+1}, h_{t+1}, a_t).$$

in a case that the search conditions are independent of each other, a following calculation formula is obtained:

$$P(candidate_n) = \eta \cdot \prod_{i=0} P(slot_i | o_{t+1}, h_{t+1}, a_t)$$
$$= \theta \cdot \prod_{i=0} P(slot_i | o_{t+1}) \cdot P(slot_i | h_{t+1}) \cdot P(slot_i | a_t),$$

Wherein $\eta$ and $\theta$ are normalized constants, slot is a key search fragment of the search condition, for example, "song" only referring to a Jay Chou's song; a is an operation executed, h is a history state record, and o is an detected value for a user input, for example, a search condition input by a user and detected by a system being "playing a Jay Chou's song". In addition, $P(slot_i | o_{t+1}) = P(slot_i | slots_{t+1}) \cdot P(slot_i | terms_{t+1}) \cdot$ rule (syntactical feature)

$P(slot_i | h_{t+1}) =$ function(session num, session time)

$P(slot_i | a_t) =$ rule(bot state)

The specific function expressions have been described above, and thus are not be repeated here.

Preferably, the acquiring and determining unit is further configured to, after acquiring search conditions input by a user in multiple searches, determine the search condition input by the user is incomprehensible if more than one result is obtained by searching according to the literal meaning of the search condition; and query the user for a comprehensible search condition. The querying operation has been described in the method 300, and thus is not repeated herein.

With the above system 400, a machine can know the search purpose of the user in continuous multiple searches, and can understand the search purpose of the user under a continuous multi-search case and provide the best feedback to the user; and moreover, the user may continuously modify or improve his/her requirements in the interactions. In addition, the technical effect of helping the user to find a satisfactory result by questioning, a request for selecting or a request for confirming in case that the input from the user is incomprehensible can be achieved.

Figure 5:
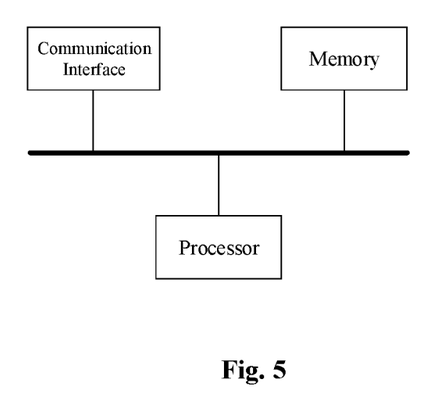
FIG. 5 shows a schematic view of a terminal according to the present application.

According to the third aspect of the present application, a terminal is provided. As shown in FIG. 5, the terminal includes one or more processors, and a memory configured to store one or more programs. The one or more processors implement the method 100, 200 or 300 described above when executing the one or more programs.

There may be one or more memories and processors.

The equipment further includes: a communication interface configured to communicate the one or more processor and the memory with external equipment.

The memory may include a high-speed RAM memory, and may also include a non-volatile memory, for example, at least one magnetic disk memory.

If the memory, the processor and the communication interface are implemented independently, the memory, the processor and the communication interface may be connected to one another through a bus and communicated with one another. The bus may be an ISA (Industry Standard Architecture) bus, a PCI (Peripheral Component Peripheral Component) bus, an EISA (Extended Industry Standard Component) bus, or the like. The bus may be classified into an address bus, a data bus, a control bus and the like. For facilitating representation, the bus is represented by only one bold line in FIG. 5, but does not mean that there is only one bus or only one kind of bus.

Optionally, in the specific implementation, if the processor, the memory and the communication interface are integrated on a chip, the processor, the memory and the communication interface may be communicated with one another through an internal interface.

In the description, the content described in the reference terms such as "one embodiment", "some embodiments", "an example", "a specific example", "some examples" and the like means that specific features, structures, materials or characteristics described in combination with the embodiment or example are included in at least one embodiment or example of the present application. Moreover, the described specific features, structures, materials, or characteristics may be combined in any suitable manner in any one or more embodiments or examples. In addition, in the case without mutual contradiction, different embodiments or examples described and features of the different embodiments or examples in this description may be combined by those skilled in the art.

In addition, the terms "first", "second" and the like are only intended to describe, and should not be construed as indicating or implying the relative importance. Thus, features defined with "first" and "second" may explicitly or implicitly include at least one of the features. In the description of the present application, "a plurality of/multiple" means two or more unless otherwise specified.

Any process or method described herein in other manners in the flow charts or herein may be understood as representing modules, segments or portions of codes that include one or more executable instructions for implementing steps of a particular logical function or process, and the scope of the preferred embodiments of the present application includes additional implementations. Functions may be performed out of the order shown or discussed, including conditions that the involved functions may be performed simultaneously substantially or in the reverse order, which should be understood by those skilled in the art to which the embodiments of the present application belongs.

Logic and/or steps, which are shown in the flow charts or described herein in other manners, may be considered as, for example, a sequencing list of executable instructions for implementing logic functions; and particularly, the sequencing list may be implemented in any computer-readable medium to be used by an instruction execution system, device or equipment (such as a computer-based system, a processor-included system, or other system that can acquire instructions from the instruction execution system, device or equipment and execute the instructions), or to be used in combination with the instruction execution system, device or equipment. In this description, the "computer-readable medium" may be any device that may include, store, communicate, propagate or transport the program to be used by the instruction execution system, device or equipment or to be used in combination with the instruction execution system, device or equipment. More particularly, a non-exhaustive list of the computer-readable medium exemplarily includes the followings: an electric connection element (electronic device) having one or more wires, a portable computer disk cartridge (magnetic device), a random access memory (RAM) a read-only memory (ROM), an erasable programmable read-only memory (EPROM or flash memory), an optical fiber device and a compact disc read-only memory (CDROM). In addition, the computer-readable medium may even be paper or another suitable medium on which the program can be printed. The program may be electronically acquired by, for example, optically scanning the paper or another suitable medium, and then performing editing and interpretation or processing in other appropriate manners if necessary, and then is stored in a computer memory.

It should be understood that various portions of the present application may be implemented by hardware, software, firmware, or a combination thereof. In the above embodiments, multiple steps or methods may be implemented in software or firmware stored in the memory and executed by a suitable instruction execution system. For example, if the multiple steps or methods are implemented in hardware, like the implementation in another embodiment, the multiple steps or methods may be implemented by using any one or a combination of the following techniques well known in the art, the techniques including: a discrete logic circuit provided with a logic gate circuit configured to realize logic functions of data signals, an application-specific integrated circuit having a suitable combinational logic gate circuit, a programmable gate array (PGA), a field programmable gate array (FPGA), and the like.

It should be understood by those skilled in the art that all or part of the steps of the methods in the above embodiments can be implemented through a program that give instructions to related hardware; and the program can be stored in a computer-readable storage medium and includes one of the steps of the methods in the embodiments or a combination thereof when being executed.

In addition, each function unit in the embodiments of the present application may be integrated in a processing module, or may exist alone physically; or two or more function units may be integrated in a module. The above-mentioned integrated module may be implemented in the form of hardware or in the form of a software function module. The integrated module may also be stored in a computer-readable storage medium if being implemented in the form of the software function module and sold or used as an independent product. The storage medium may be a read-only memory, a magnetic disk, an optical disk or the like.

The foregoing descriptions are merely several specific embodiments of the present application, and the protection scope of the present application is not limited thereto. Various variations or modifications that can be made easily by those skilled in the art should fall within the protection scope of the present application. Therefore, the protection scope of the present application shall be subject to the protection scope of the claims.

What is claimed is:

1. A searching method based on multi-round inputs, comprising:
   acquiring search conditions input by a user in multiple searches, wherein the multiple searches comprise at least two searches;
   determining a multi-round property between at least two searches of the multiple searches; wherein the multi-round property represents a correlation of the search conditions of the at least two searches;
   determining a search purpose of one of the search conditions, and determining that the search purpose of the one of the search conditions is a multi-round search purpose, wherein the multi-round search purpose indicates that the one of the search conditions is associated with the other search conditions input by the user;
   generating search results based on the multi-round search purpose and search conditions input by the user, wherein the search results is generated by combining the search conditions; and
   ranking the generated search results, and determining and presenting an optimal search result,
   wherein the determining a search purpose of one of the search conditions and determining that the search purpose of the one of the search conditions is a multi-round search purpose comprises:
   calculating a probability that the one of the search condition is a combined search condition based on a structured analysis model or a deep learning model; and
   determining that the search purpose of the one of the search is the multi-round search purpose if the calculated probability is greater than a preset threshold.

2. The searching method according to claim 1, wherein the determining a multi-round property between at least two searches of the multiple searches comprises:
   smoothing the search conditions according to resources, requirements and a prior distribution;
   calculating a bi-gram-based language model for the search condition based on the smoothed search conditions; and
   determining the multi-round property between the at least two searches of the multiple searches according to the bi-gram-based language model.

3. The searching method according to claim 1, wherein the deep learning model is an Long Short Term Memory (LSTM) model, and the probability that the one of the search conditions is the combined search condition is obtained by performing a classification training with the LSTM model; or
   the probability that the search condition of this search is a combined search condition is calculated in the structured analysis model by a formula:

$$p(x) = \frac{\sum_{i=1}^{n}(x_i w_i \lambda_i \mid \text{domain}, \phi)}{\sum_{i=1}^{n} x_i w_i},$$

wherein $\phi$ is a set of structured features, w is importance of a term in the one of the search condition, $\lambda$ is a weight of a positive or negative feature, domain is a search purpose of the last search, and x is a set of terms in the one of the search condition; wherein a term is a semantic unit.

4. The searching method according to claim 1, wherein ranking the generated search results, and determining and presenting an optimal search result comprises:
  pruning the generated search results; and
  ranking the search results retained after pruning, and determining and presenting the optimal search result.

5. The searching method according to claim 4, wherein the pruning is performed based on following conditions that:
  the one of the search conditions is only associated to a search condition of the last search;
  the generated search results comprises newly added semantic data in this search; and
  the generated search results comprises reference semantic expressions in this search and data corresponding to the reference semantic expressions.

6. The searching method according to claim 1, wherein the ranking the generated search results comprises:
  calculating occurrence probabilities of the respective generated search results based on a generative model or a discriminant model; and
  ranking the generated search results according to the calculated occurrence probabilities.

7. The searching method according to claim 6, wherein the discriminative model is a Gradient Boosted Decision Tree (GBDT) model and the occurrence probability of a search result is calculated by performing a discriminative training with the GBDT model; or
  the occurrence probabilities of the respective generated search results are calculated with the generative model according to a probability calculation formula as follows:

$$P(\text{candidate}_n) = \eta \cdot P(\text{slots}_n | o_{t+1}, h_{t+1}, a_t),$$

wherein in a case that the search conditions are independent of each other, a following calculation formula is obtained:

$$P(\text{candidate}_n) = \eta \cdot \prod_{i=0} P(\text{slot}_i | o_{t+1}, h_{t+1}, a_t)$$
$$= \theta \cdot \prod_{i=0} P(\text{slot}_i | o_{t+1}) \cdot P(\text{slot}_i | h_{t+1}) \cdot P(\text{slot}_i | a_t),$$

wherein η and θ are normalized constants, slot is a key search fragment of the search condition, a is an operation executed, h is a history state record, and o is an detected value for a user input; and $$P(\text{slot}_i | o_{t+1}) = P(\text{slot}_i | \text{slots}_{t+1}) \cdot P(\text{slot}_i | \text{terms}_{t+1}) \cdot \text{rule}$$
(syntactical feature)

$$P(\text{slot}_i | h_{t+1}) = \text{function}(\text{session num}, \text{session time})$$

$$P(\text{slot}_i | a_t) = \text{rule}(\text{bot state})$$

wherein $P(\text{slot}_i | \text{slots}_{t+1})$ represents an occurrence probability of a combination of a slot in the search conditions of the last search and a slot in the one of the search conditions, $P(\text{slot}_i | \text{terms}_{t+1})$ represents an occurrence probability of a combination of a slot in the search conditions of the last search and a term that are not comprised in the slot of the one of the search conditions, the rule(syntactical feature) represents a rule of syntactical features, the function (session num, session time) represents an attenuation function of the probability of a slot over time and input times, and the rule(bot state) represents a rule-based calculation function in combination of an action state of a system.

8. The searching method according to claim 1, wherein after acquiring search conditions input by a user in multiple searches, the searching method further comprises:
  determining the search condition input by the user is incomprehensible if more than one result is obtained by searching according to the literal meaning of the search condition; and
  querying the user for a comprehensible search condition.

9. The searching method according to claim 8, wherein the querying is performed in at least one of the following forms: questioning, requesting for selecting and requesting for confirming.

10. A searching system based on multi-round inputs, comprising:
  one or more processors; and
  a storage device configured for storing one or more programs, wherein the one or more programs are executed by the one or more processors to enable the one or more processors to:
  acquire search conditions input by a user in multiple searches and determine a multi-round property between at least two searches of the multiple searches; wherein the multiple searches comprise at least two searches and the multi-round property represents a correlation of the search conditions of the at least two searches;
  determine a search purpose of one of the search conditions, and determine that the search purpose of the one of the search conditions is a multi-round search purpose, wherein the multi-round search purpose indicates that the one of the search conditions is associated with the other search conditions input by the user;
  generate search results based on the multi-round search purpose and search conditions input by the user, wherein the search results is generated by combining the search conditions; and
  rank the generated search results, and determine and present an optimal search result,
  wherein the one or more programs are executed by the one or more processors to enable the one or more processors further to:
  calculate a probability that the one of the search condition is a combined search condition based on a structured analysis model or a deep learning model; and
  determine that the search purpose of the one of the search is the multi-round search purpose if the calculated probability is greater than a preset threshold.

11. The searching system according to claim 10, wherein the one or more programs are executed by the one or more processors to enable the one or more processors further to:
  smooth the search conditions according to resources, requirements and a prior distribution;
  calculate a bi-gram-based language model for the search condition based on the smoothed search conditions; and
  determine the multi-round property between the at least two searches of the multiple searches according to the bi-gram-based language model.

12. The searching system according to claim 10, wherein the deep learning model is an Long Short Term Memory (LSTM) model, and the probability that the one of the search conditions is the combined search condition is obtained by performing a classification training with the LSTM model; or
  the probability that the search condition of this search is a combined search condition is calculated in the structured analysis model by a formula:

$$p(x) = \frac{\sum_{i=1}^{n}(x_i w_i \lambda_i \mid \text{domain}, \phi)}{\sum_{i=1}^{n} x_i w_i},$$

wherein φ is a set of structured features, w is importance of a term in the one of the search conditions, λ is a weight of a positive or negative feature, domain is a search purpose of the last search, and x is a set of terms in the one of the search condition; wherein a term is a semantic unit.

13. The searching system according to claim 10, wherein the one or more programs are executed by the one or more processors to enable the one or more processors further to:
   prune the generated search results; and
   rank the search results retained after pruning, and determine and present the optimal search result.

14. The searching system according to claim 13, wherein pruning the generated search results is performed based on the following conditions that:
   the one of the search conditions is only associated to a search condition of the last search;
   the generated search results comprises newly added semantic data in this search; and
   the generated search results comprises reference semantic expressions in this search and data corresponding to the reference semantic expressions.

15. The searching system according to claim 10, wherein the one or more programs are executed by the one or more processors to enable the one or more processors further to:
   calculate occurrence probabilities of the respective generated search results based on a generative model or a discriminant model; and
   rank the generated search results according to the calculated occurrence probabilities;
   wherein the discriminative model is a Gradient Boosted Decision Tree (GBDT) model and the occurrence probability of a search result is calculated by performing a discriminative training with the GBDT model; or
   the occurrence probabilities of the respective generated search results are calculated with the generative model according to a probability calculation formula as follows:

$$P(\text{candidate}_n) = \eta \cdot P(\text{slots}_n | o_{t+1}, h_{t+1}, a_t),$$

in a case that the search conditions are independent of each other, a following calculation formula is obtained:

$$P(candidate_n) = \eta \cdot \prod_{i=0} P(slot_i \mid o_{t+1}, h_{t+1}, a_t)$$
$$= \theta \cdot \prod_{i=0} P(slot_i \mid o_{t+1}) \cdot P(slot_i \mid h_{t+1}) \cdot P(slot_i \mid a_t),$$

wherein η and θ are normalized constants, slot is a key search fragment of the search condition, a is an operation executed, h is a history state record, and o is an detected value for a user input; and;

$P(\text{slot}_i | o_{t+1}) = P(\text{slot}_i | \text{slots}_{t+1}) \cdot P(\text{slot}_i | \text{terms}_{t+1}) \cdot \text{rule}$ (syntactical feature)

$P(\text{slot}_i | h_{t+1}) = \text{function}(\text{session num}, \text{session time})$ $P(\text{slot}_i | a_t) = \text{rule}(\text{bot state})$ wherein $P(\text{slot}_i | \text{slots}_{t+1})$ represents an occurrence probability of a combination of a slot in the search conditions of the last search and a slot in the one of the search conditions, $P(\text{slot}_i | \text{terms}_{t+1})$ represents an occurrence probability of a combination of a slot in the search conditions of the last search and a term that are not comprised in the slot of the one of the search conditions, the rule(syntactical feature) represents a rule of syntactical features, the function (session num, session time) represents an attenuation function of the probability of a slot over time and input times, and the rule(bot state) represents a rule-based calculation function in combination of an action state of a system.

16. The searching system according to claim 10, wherein the one or more programs are executed by the one or more processors to enable the one or more processors further to, after acquiring search conditions input by a user in multiple searches,
   determine the search condition input by the user is incomprehensible if more than one result is obtained by searching according to the literal meaning of the search condition; and
   query the user for a comprehensible search condition.

17. A non-transitory computer-readable storage medium, storing computer executable instructions stored thereon, that when executed by a processor cause the processor to perform operations comprising:
   acquiring search conditions input by a user in multiple searches, wherein the multiple searches comprise at least two searches;
   determining a multi-round property between at least two searches of the multiple searches; wherein the multi-round property represents a correlation of the search conditions of the at least two searches;
   determining a search purpose of one of the search conditions, and determining that the search purpose of the one of the search conditions is a multi-round search purpose, wherein the multi-round search purpose indicates that the one of the search conditions is associated with the other search conditions input by the user;
   generating search results based on the multi-round search purpose and search conditions input by the user, wherein the search results is generated by combining the search conditions; and
   ranking the generated search results, and determining and presenting an optimal search result,
   wherein the determining a search purpose of one of the search conditions and determining that the search purpose of the one of the search conditions is a multi-round search purpose comprises:
   calculating a probability that the one of the search condition is a combined search condition based on a structured analysis model or a deep learning model; and
   determining that the search purpose of the one of the search is the multi-round search purpose if the calculated probability is greater than a preset threshold.

* * * * *